US010574136B2

(12) United States Patent
Giuntini (10) Patent No.: US 10,574,136 B2
(45) Date of Patent: Feb. 25, 2020

(54) METHODS AND SYSTEMS FOR CONTROLLING CURRENT SOURCE RECTIFIERS

(71) Applicant: ABB Schweiz AG, Baden (CH)

(72) Inventor: Lorenzo Giuntini, Locarno (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/955,077

(22) Filed: Apr. 17, 2018

(65) Prior Publication Data

US 2019/0319546 A1    Oct. 17, 2019

(51) Int. Cl.
*H02M 1/42*    (2007.01)
*H02M 7/219*   (2006.01)
*H02M 1/12*    (2006.01)
*H02J 9/06*    (2006.01)
*H02M 1/00*    (2006.01)

(52) U.S. Cl.
CPC ......... *H02M 1/4216* (2013.01); *H02M 1/126* (2013.01); *H02M 7/219* (2013.01); *H02J 9/061* (2013.01); *H02M 2001/0054* (2013.01); *Y02B 70/126* (2013.01)

(58) Field of Classification Search
CPC ...... Y02B 70/126; H02J 9/061; H02M 1/126; H02M 1/4216; H02M 1/4208; H02M 1/4233; H02M 7/217; H02M 7/219; H02M 7/125; H02M 7/04; H02M 7/162; H02M 1/1623; H02M 7/155; H02M 1/08; H02M 1/081; H02M 2001/0054; H02M 2001/0019
See application file for complete search history.

(56) References Cited

U.S. PATENT DOCUMENTS

| | | | |
|---|---|---|---|
| 5,345,375 A | * | 9/1994 | Mohan ............ H02J 3/01 307/105 |
| 8,223,511 B2 | | 7/2012 | Cheng et al. |
| 8,873,261 B1 | | 10/2014 | Cuzner |
| 8,947,897 B2 | | 2/2015 | Yamanaka |
| 9,001,542 B2 | | 4/2015 | Takatsuka et al. |

(Continued)

OTHER PUBLICATIONS

M. Baumann et al. "Comparative evaluation of modulation methods for a three-phase/switch buck power factor corrector concerning the input capacitor voltage ripple" PESC 2001.
T. Halkosaari at al. "Optimal vector modulation of a PWM current source converter according to minimal switching losses", PESC 2000.

(Continued)

*Primary Examiner* — Gustavo A Rosario-Benitez
(74) *Attorney, Agent, or Firm* — Barnes & Thornburg LLP (57) ABSTRACT

Current source rectifiers (CSR) and methods for a power source including three phase lines are provided herein. The CSR includes a rectifier having a plurality of switches, each switch of the plurality of switches coupled to an associated phase line of the three phase lines. The rectifier operable to receive an alternating current (AC) input voltage and provide a direct current (DC) output voltage. The CSR also includes a controller configured to control operation of the switches in accordance with a first switching sequence when measured input voltages on at least two phase lines of the three phase lines are outside of a predetermined voltage range, and control operation of the switches in accordance with a second switching sequence when the measured input voltages on the at least two phase lines are within the predetermined voltage range.

17 Claims, 6 Drawing Sheets

(56) References Cited

U.S. PATENT DOCUMENTS

| | | | |
|---|---|---|---|
| 9,240,732 B2 | 1/2016 | Cuzner et al. | |
| 9,270,198 B2 | 2/2016 | Tolbert et al. | |
| 9,774,246 B2 | 9/2017 | Wang et al. | |
| 2008/0219036 A1* | 9/2008 | Colombi | H02J 9/062 |
| | | | 363/126 |
| 2013/0127361 A1* | 5/2013 | Weng | H05B 33/0815 |
| | | | 315/224 |
| 2013/0314953 A1* | 11/2013 | Cuzner | H02M 5/4585 |
| | | | 363/37 |
| 2015/0171663 A1 | 6/2015 | Krstic et al. | |
| 2017/0229972 A1* | 8/2017 | Cerqueira Pinto Bezerra Varaj O | G01R 25/005 |
| 2017/0279370 A1 | 9/2017 | Zhao et al. | |

OTHER PUBLICATIONS

T. Nussbaumer et al., "Improving mains current quality for three-phase three-switch buck-type PWM rectifiers", IEEE Trans. on Power El. 21(4), Jul. 2006.

B. Guo at al. "Compensation of input current distortion in three-phase buck rectifiers", APEC 2013.

Y. W. Li at al. "Space vector sequence investigation and synchronization methods for active front-end rectifiers in high-power current-source drives", IEEE, Trans. on Ind. Ele. 55(3), Mar. 2008.

M. H. Bierhoff at al. "Semiconductor losses in voltage source and current source IGBT converters based on analytical derivation", PESC 2004.

International Search Report and Written Opinion issued in related PCT Application No. PCT/EP2019/059924, dated Jul. 24, 2019, 38 pages.

* cited by examiner

METHODS AND SYSTEMS FOR CONTROLLING CURRENT SOURCE RECTIFIERS

BACKGROUND

The field of the invention relates generally to current source rectifiers (CSRs), and more particularly, to methods and control systems for controlling active rectifiers in CSR systems.

CSRs are commonly used in a variety of applications, such as in uninterruptible power supplies (UPSs), telecommunication and data centers, electric motors, etc., because of their ability to operate the CSR at unity power factor with sinusoidal AC currents. At the same time, efficiency is a fundamental criterion that is considered during selection of a CSR system. Therefore, reduction of losses is an important factor for successful market adoption of current source conversion technology.

There are two desirable, but competing, parameters associated with CSRs: high efficiency and low current distortion. Reducing switching losses by using some known modulation sequences introduces undesirable side effects in terms of input current distortion. Other known solutions, for example, increasing input filter capacitance or increasing the switching frequency, are not of practical use and may compromise cost/footprint or performance.

BRIEF DESCRIPTION

A current source rectifier (CSR) system for a power source including three phase lines is provided herein. The CSR includes a rectifier having a plurality of switches, each switch of the plurality of switches coupled to an associated phase line of the three phase lines. The rectifier operable to receive an alternating current (AC) input voltage and provide a direct current (DC) output voltage. The CSR also includes a controller configured to control operation of the switches in accordance with a first switching sequence when measured input voltages on at least two phase lines of the three phase lines are outside of a predetermined voltage range, and control operation of the switches in accordance with a second switching sequence when the measured input voltages on the at least two phase lines are within the predetermined voltage range. The CSR system includes a rectifier having a plurality of switches, each switch of said plurality of switches coupled to one phase line of three phase lines of a power source for receiving an alternating current (AC) input voltage and providing a direct current (DC) output voltage. The CSR system also includes a controller configured to control operation of the switches in accordance with a first switching sequence based on a comparison of measured input voltages on at least two phase lines of the three phase lines, and control operation of the switches in accordance with a second switching sequence when the measured input voltages on the at least two phase lines are within a predetermined voltage range.

A method of controlling a current source rectifier (CSR) that includes a controller and a rectifier having a plurality of switches is provided. Each switch is coupled to an associated phase line of three phase lines of a power source. The method includes receiving, by the rectifier, three-phase alternating-current (AC) voltages from the power source. The method also includes controlling, by the controller, operation of the plurality of switches in accordance with a first switching sequence when measured input voltages on at least two phase lines of the three phase lines are outside of a predetermined voltage range. The method further includes controlling, by the controller, operation of the plurality of switches in accordance with a second switching sequence when the measured input voltages on the at least two phase lines are within the predetermined voltage range.

DETAILED DESCRIPTION

Figure 1:
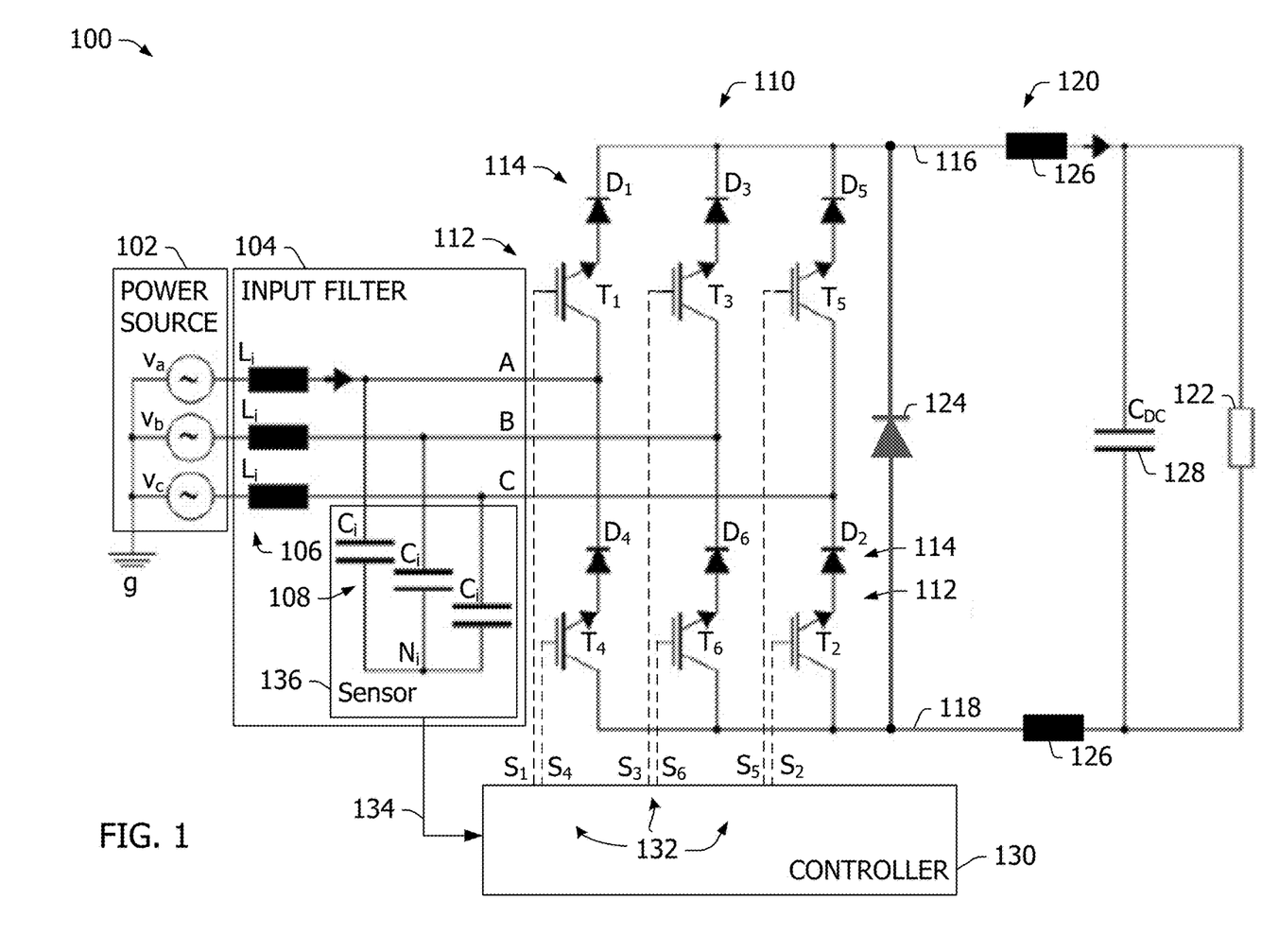
FIG. 1 is a circuit diagram of an exemplary three-phase current source rectifier (CSR).

FIG. 1 is a circuit diagram of an exemplary three-phase current source rectifier (CSR) 100. As shown in FIG. 1, CSR 100 is a buck-type pulse-width-modulated (PWM) rectifier CSR 100 is coupled to a power source 102 that generates three alternating current (AC) input voltages $v_a$, $v_b$, and $v_c$ relative to a ground connection g. AC input voltages $v_a$, $v_b$, and $v_c$ are provided to CSR 100 via three phase lines A, B, C, respectively. In the exemplary embodiment, power source 102 is a three-phase AC voltage source such as a grid or utility. However, in alternative embodiments, power source 102 may provide single-phase or multi-phase power to CSR 100.

CSR 100 includes an input filter 104 coupled to power source 102. Input filter 104 includes an input filtering inductor 106 $L_i$ coupled on each phase line A, B, C and an input filter capacitor 108 $C_i$ coupled between respective phase lines A, B, C and a mid-point node $N_i$. Input filter 104 is configured to prevent injection of high frequency switching harmonics by CSR 100.

In the exemplary embodiment, CSR 100 includes a rectifier 110 coupled to an output side of input filter 104. Rectifier 110 is operable to receive an alternating current (AC) input voltage and generate a direct current (DC) output voltage. Rectifier 110 is an active switching-type CSR and includes six switches 112 (T1, T2, T3, T4, T5, T6) and six diodes 114 (D1, D2, D3, D4, D5, D6) series-coupled with switches 112 T1-T6, respectively, between a positive line 116 and a negative line 118. Switches T1, T4 and diodes D1, D4 form a first phase leg of rectifier 110, which is coupled to phase line A for receiving input voltage $v_a$. Switches T3, T6 and diodes D3, D6 form a second phase leg of rectifier 110, which is coupled to phase line B for receiving input voltage $v_b$. Switches T5, T2 and diodes D5, D2 form a third phase leg of rectifier 110, which is coupled to phase line C for receiving input voltage $v_c$. Accordingly, each switch of switches 112 T1-T6 is coupled to an associated phase line of the three phase lines A, B, C. In the exemplary embodiment, switches 112 T1-T6 are silicon insulated-gate bipolar transistors (IGBTs). Alternatively, switches 112 T1-T6 may include bipolar junction transistors (BJTs), metal-oxide-semiconductor field effect transistors (MOSFETs), junction field effect transistors (JFETs), Gate turn-off (GTO) thyristors, integrated gate-commutated thyristors (IGCTs), or the like.

A DC link 120 is defined on positive line 116 and negative line 118 between an output of rectifier 110 and a load 122, which may be an inverter. In the exemplary embodiment, DC link 120 includes a freewheeling diode $D_f$ 124, a filter inductor $L_{DC}$ 126, and a DC link capacitor $C_{DC}$ 128. Freewheeling diode $D_f$ 124 includes a cathode coupled to positive line 116 and an anode coupled to negative line 118, and allows current to flow only from negative line 118 to positive line 116 through freewheeling diode $D_f$ 124. The presence of freewheeling diode $D_f$ 124 is optional, but when present, it operable to reduce conduction losses when regenerative capability is not necessary.

DC link capacitor $C_{DC}$ 128 is also coupled to positive line 116 and negative line 118, and is configured to filter or smooth the pulsed DC voltage output by rectifier 110. Filter inductor $L_{DC}$ 126 is coupled to both positive line 116 and negative line 118 between freewheeling diode $D_f$ 124 and DC link capacitor $C_{DC}$ 128. The filtered DC voltage is then provided to load 122.

A controller 130 is communicatively coupled to each of switches 112 T1-T6 and is operable to control operation of switches 112 T1-T6 in accordance with switching sequences based on whether measured input voltages on at least two phase lines of the three phase lines A, B, C are inside or outside of a predetermined voltage range. In the exemplary embodiment, the first switching sequence is a high-efficiency switching sequence configured to improve efficiency of CSR system 100 when the measured input voltages are outside the predetermined voltage range, and the second switching sequence is a high-quality switching sequence configured to reduce current distortion caused when the measured input voltages are within the predetermined voltage range.

In the exemplary embodiment, controller 130 includes one or more processors and associated memory as well as I/O circuits including driver circuitry for generating switching control signals 132 S1-S6 to selectively actuate switches T1-T6, respectively. Controller 130 may be implemented as any suitable hardware, processor-executed software, processor-executed firmware, programmable logic, or combinations thereof, operative as any suitable controller or regulator by which rectifier 110 is controlled according to one or more desired switching sequences.

During operation, controller 130 provides switching control signals 132 S1-S6 for causing rectifier 110 to convert AC electrical input power to provide a regulated DC current $I_{DC}$ to DC link 120. In determining a switching sequence to apply, controller 130 may employ one or more feedback signals or values 134, such as phase voltages $v_a$, $v_b$, and $v_c$ measured by at least one sensor 136 coupled across input filter capacitors 108 $C_i$ and/or the DC link current $I_{DC}$ and/or DC link voltage. DC-link voltage sensing is typically required for regulation, as it is the controlled output of the converter. Additionally, the DC link current $I_{DC}$ may be used for current-limiting operations (e.g. battery recharge) and protection schemes (e.g. converter shutdown under load side fault). Further, in some embodiments, the DC link current $I_{DC}$ may be used as a feed-forward term in the converter control. Controller 130 may also implement other control functions such as power factor correction.

Figure 2:
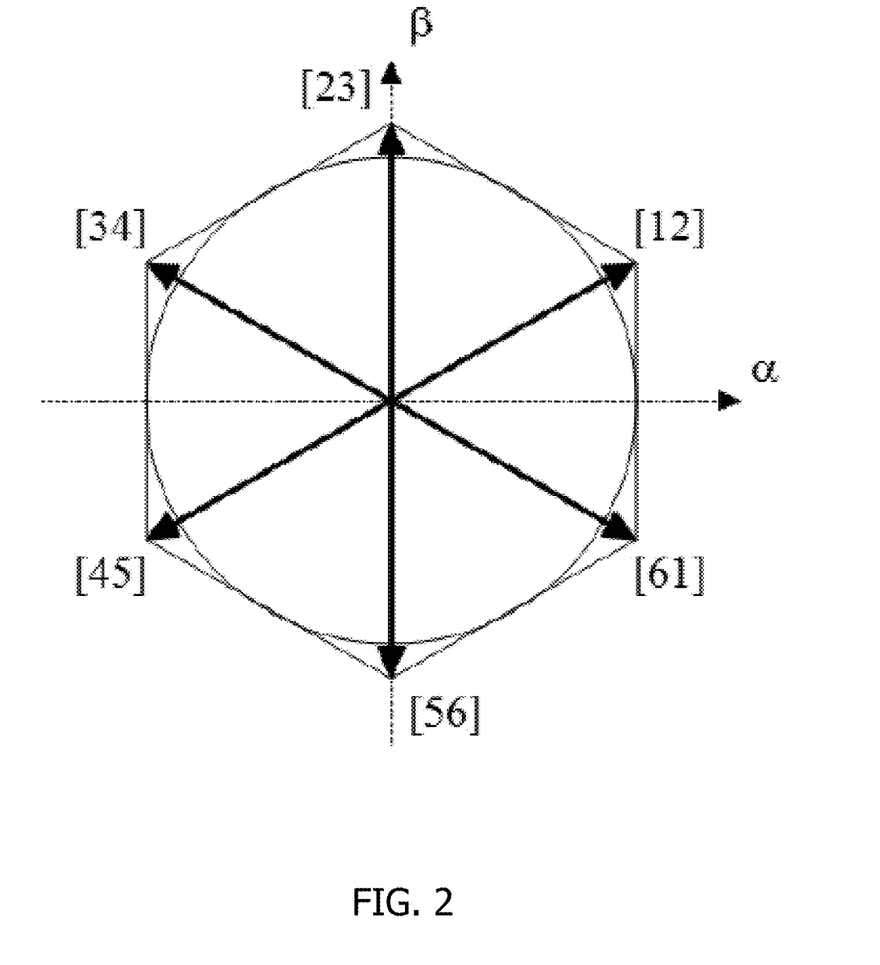
FIG. 2 is a space vector diagram for controlling the CSR shown in FIG. 1.

FIG. 2 is a space vector diagram 200 for controlling CSR 100 (shown in FIG. 1). Space vector modulation (SVM) is a common strategy for driving CSRs. In the exemplary embodiment, space vector diagram 200 is provided in a Stationary Reference Frame (SRF) and includes six phase sectors. In each phase sector, a modulation vector is synthesized by combining two adjacent vectors and a zero vector (also referred to as a freewheeling vector).

At any given time, only two switches 112 T1-T6 may conduct: one on the upper half of rectifier 110 and the other on the lower half of rectifier 110. Detailed analysis shows that when synthesizing a current vector in a given phase sector, one switch 112 (e.g., T1) remains ON, while the two opposite switches 112 (e.g., T6 and T2) on the other two legs are commutated. The applied switching sequence affects the performance of CSR 100. It should be noted that while this description focuses solely on switches 112 T1, T6, and T2 (associated with vectors [12] and [61] in FIG. 2), a substantially similar analysis and procedure may be applicable to any and all other switch combinations, and their description will not be repeated herein.

Switching losses within CSR 100 may be minimized by selecting an appropriate switching sequence. However, minimal switching loss strategies may exhibit undesirable side effects such as degradation of the input performance (mainly in terms of current distortion).

Figure 3:
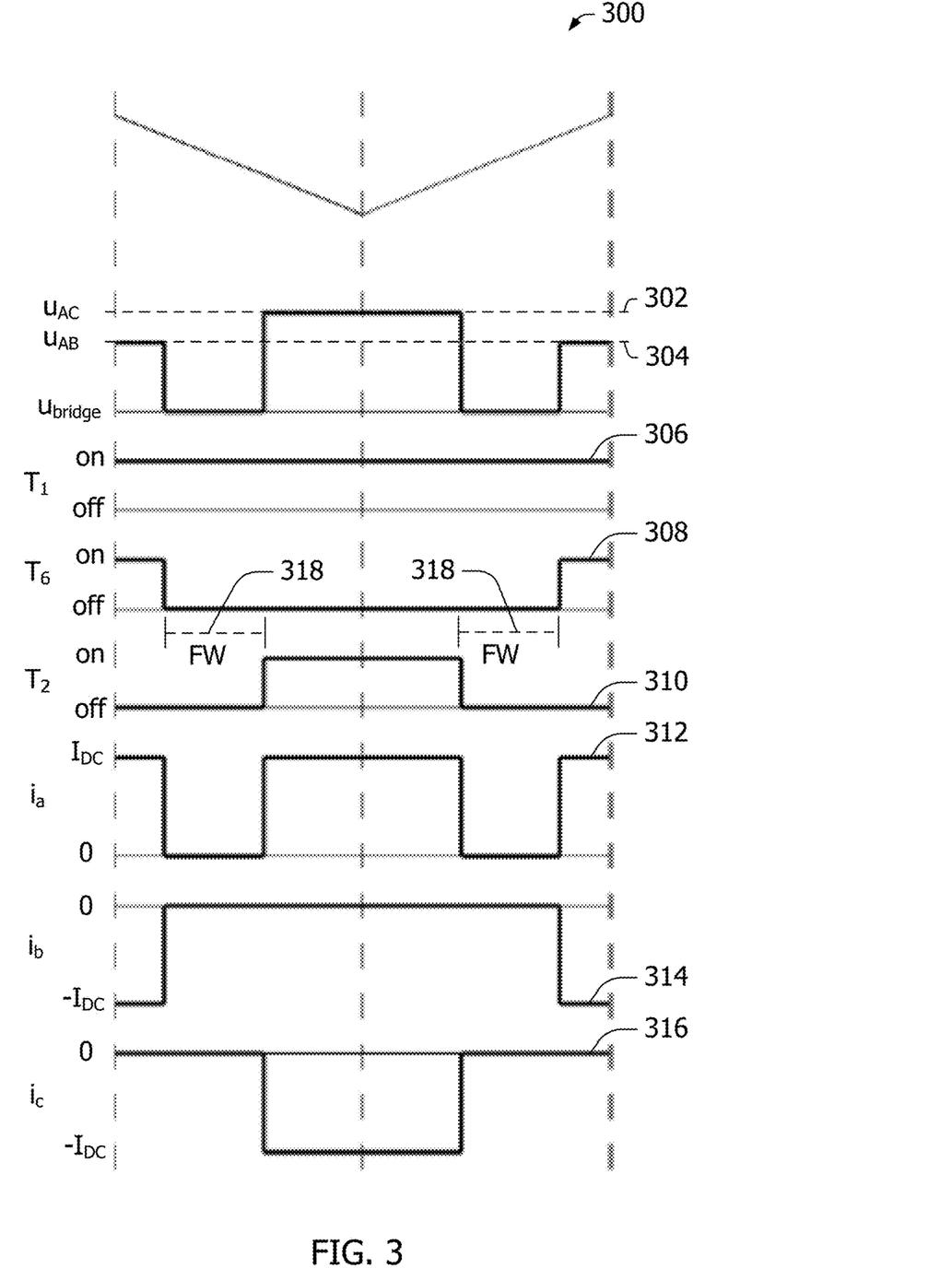
FIG. 3 illustrates a high-quality switching sequence for controlling the CSR shown in FIG. 1.

FIG. 3 illustrates a high-quality switching sequence 300 for controlling CSR 100 (shown in FIG. 1). Switching sequence 300 includes the voltage imposed by the rectifier bridge onto the DC-link (either line-line voltage 302 $u_{AC}$ measured between capacitors $C_i$ on phase lines A, C, or line-line voltage 304 $u_{BC}$ measured across capacitors $C_i$ on phase lines B, C, depending on switch state), switching state signals 306, 308, 310 for each of switches 112 TR1, TR6, TR2, respectively, and input currents 312, 314, 316 $i_A$, $i_B$, $i_C$.

In the exemplary embodiment, to apply the high-quality switching sequence 300, controller 130 generates symmetric switching pulses for the two commutated switches 112 T2 and T6 including a freewheeling state 318 following each of the symmetric switching pulses. Free-wheeling states 318 occur where both switches 112 T2 and T6 are OFF. That is, a freewheeling vector is interposed between the vectors for the active switches 112 T6, T2. Each leg is locked for 60° of the phase cycle time, and so each switch 112 T1-T6 is on for 60° of the time. In the illustrated embodiment, switch 112 T1 is locked ON, while the other two switches 112 T2 and T6 are switched and commutated. Additionally, controller 130 decouples the two commutated switches 112 T2 and T6 during the freewheeling state 318 to improve a quality of the input power. Decoupling the two commutated switches 112 T2 and T6 during the freewheeling state 318 reduces current distortion near intersections of two phases of the input voltage. Further, interposing freewheeling sections 318 between pulses enables complete control of the sine wave that is going to be synthesized. This is referred to as a "high-quality" switching sequence because effectively the two switches 112 T2 and T6 are operating independently of one other. However, the "high-quality" switching sequence strategy is sub-optimal in terms of efficiency (particularly, in terms of switching losses) because each time a switch 112 is turned ON, freewheeling diode $D_f$ 124 turns ON, introducing switching losses.

Figure 4:
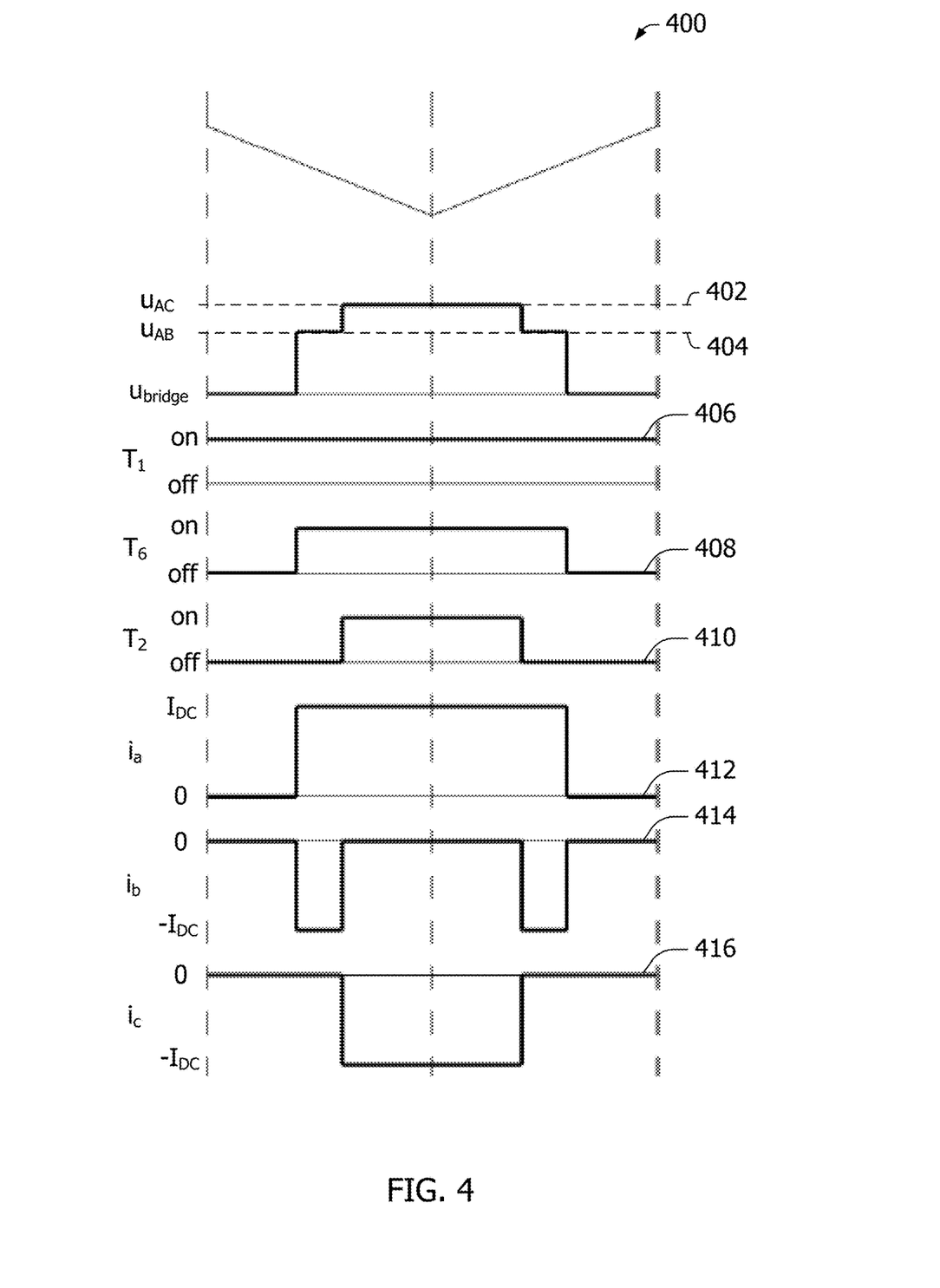
FIG. 4 illustrates a high-efficiency switching sequence for controlling the CSR shown in FIG. 1.

FIG. 4 illustrates a high-efficiency switching sequence 400 for controlling CSR 100 (shown in FIG. 1). Similarly to switching sequence 300, switching sequence 400 includes the voltage imposed by the rectifier bridge on to the DC-link (either line-line voltage 402 $u_{AC}$ measured between capacitors $C_i$ on phase lines A, C, or line-line voltage 404 $u_{BC}$ measured across capacitors $C_i$ on phase lines B, C, depending on switch state), switching state signals 406, 408, 410 for each of switches 112 T1, T6, T2, respectively, and input currents 412, 414, 416 $i_A$, $i_B$, $i_C$.

In the exemplary embodiment, controller 130 is configured to lock one switch 112 from one of the first, second, and third phase legs A, B, C in an ON position, and commutate one switch 112 from each of the two remaining phase legs. For example, in one embodiment, switch 112 T1 is locked ON, while the other two switches 112 T2 and T6 are switched and commutated.

To apply the high-efficiency switching sequence, controller 130 at least partially superimposes input voltages generated by the two commutated switches (i.e., switches 112 T2 and T6) as opposed to decoupling them. Controller 130 then determines which of the two commutated switches 112 T2 and T6 has a lower line-line voltage based on the measured input voltages, and performs all switching actions during the high-efficiency switching sequence based on the determined lower line-line voltage to facilitate operating CSR system 100 at a higher efficiency.

To apply high-efficiency switching sequence 400, controller 130 evaluates input capacitor voltage across capacitors $C_{12}$, $C_{23}$, $C_{31}$. For the two active switches 112 T6 and T2, controller 130 determines the one with the highest line-to-line voltage and the one with the lowest line-to-line voltage.

The high-efficiency modulation scheme improves efficiency by ensuring that all switching actions are performed with the minimal switched line-to-line voltage, while exposing freewheeling diode $D_f$ 124 to a single reverse-recovery event. Because switches 112 will be exposed to the lowest possible voltage, losses from freewheeling diode $D_f$ 124 are reduced and switching losses on the active switches are reduced.

However, high-efficiency switching sequence 400 suffers from power quality degradation at the sliding intersection of the input filter capacitor voltages. Due to switching ripple on input filter capacitors 108 $C_i$, the voltages across capacitors $C_i$, intersect multiple times over a switching cycle, causing associated distortion on the input current.

Figure 5:
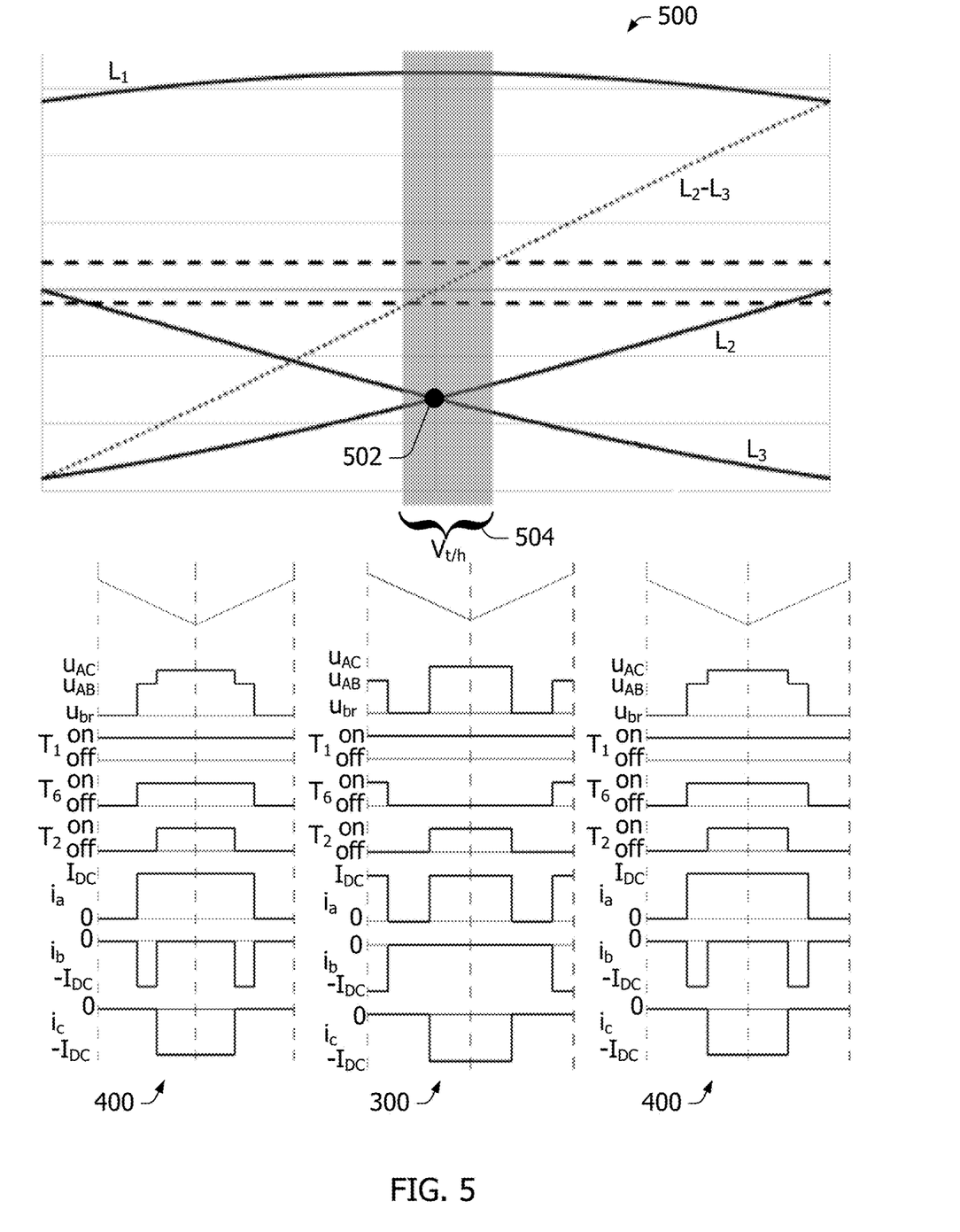
FIG. 5 illustrates an adaptive switching sequence for use in controlling the CSR shown in FIG. 1.

FIG. 5 illustrates an adaptive switching sequence 500 for use in controlling CSR 100 (shown in FIG. 1). CSR 100 is initially driven using high-efficiency switching sequence 400 (shown in FIG. 4). The line-line capacitor voltages across input capacitors $C_i$ are monitored by controller 130 (shown in FIG. 1). More specifically, controller 130 receives the measured input voltages from at least one sensor 136 coupled to the three phase lines A, B, C. Controller 130 determines whether the measured input voltages fall within a predetermined voltage range and selects which of the high-efficiency and high-quality switching sequences to apply to switches 112 T1-T6 based on the determination.

When the voltages of the two active legs T6 and T2 approach an intersection point 502 (signaled by the line-line voltages approaching zero), controller 130 changes the switching sequence being applied from high-efficiency switching sequence 400 to high-quality switching sequence 300 (shown in FIG. 3). To enable controller 130 to determine when to change the switching sequence, a predetermined voltage range 504 is defined in a memory of controller 130 using hysteresis. Predetermined voltage range 504 ensures correct selection of a switching sequence irrespective of ripple on capacitor voltage and/or line voltage distortion. After crossing intersection point 502 and exceeding predetermined voltage range 504, controller 130 changes the applied switching sequence back to high-efficiency switching sequence 400.

Because current distortion is only significantly introduced near intersection points of input voltages $v_a$, $v_b$, and $v_c$, high-quality switching sequence 300 is used when the line-line voltages are within the predetermined voltage range 504 range surrounding intersection point 502 to mitigate and/or reduce the current distortion. When the line-line voltages are not within the predetermined voltage range 504, high-efficiency switching sequence 400 is applied to achieve the highest-efficiency operation of CSR 100. By using a combination of high-efficiency and high-quality switching sequences 300, 400, adaptive switching sequence 500 facilitates capitalizing on the efficiency benefits from reduced switching losses while mitigating side effects, thereby preserving (or even improving) the high power-factor/low-distortion input characteristics of CSR 100.

Figure 6:
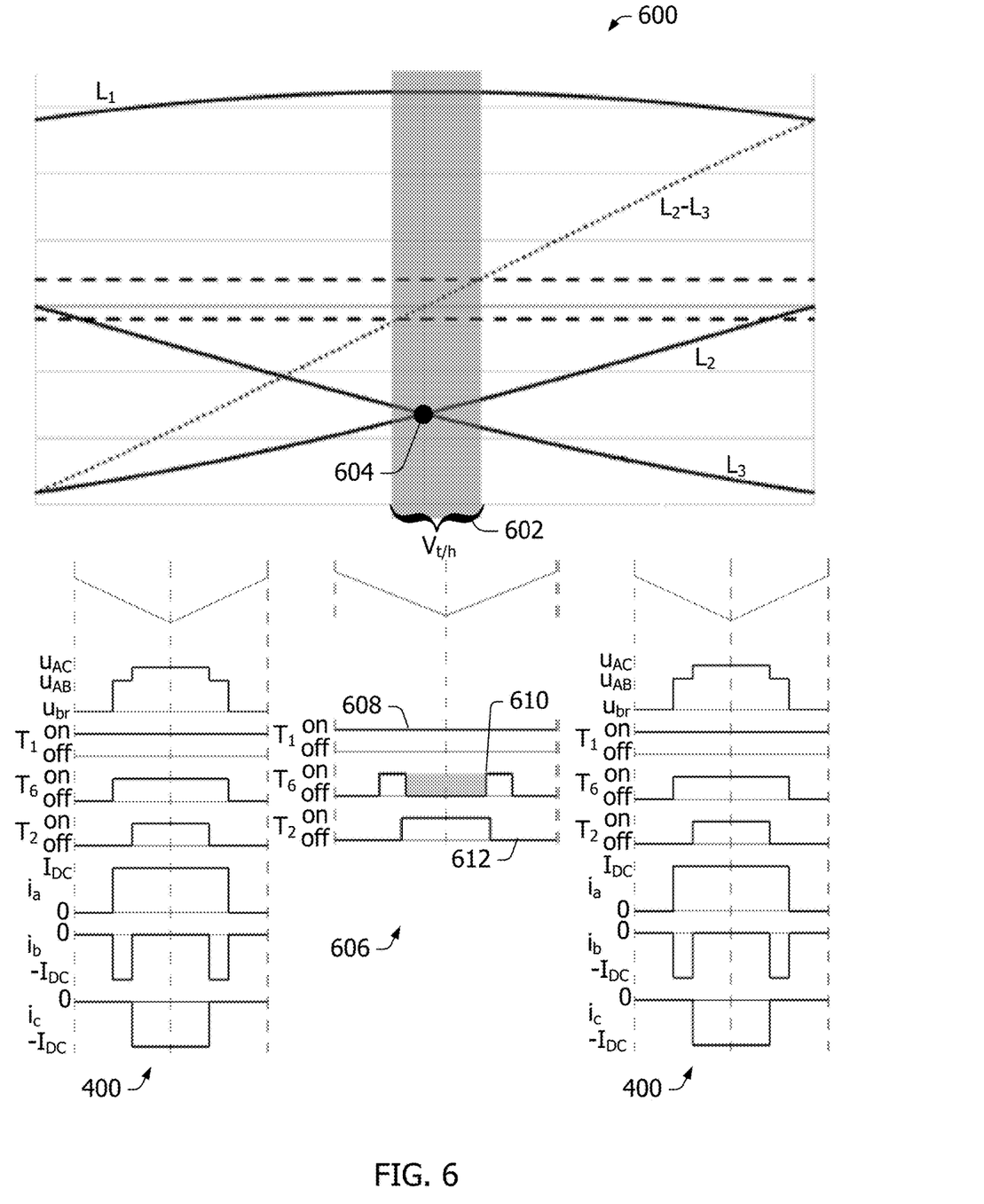
FIG. 6 illustrates an alternative adaptive switching sequence for use in controlling the CSR shown in FIG. 1.

FIG. 6 illustrates an adaptive switching sequence 600 for use in controlling CSR 100 (shown in FIG. 1). CSR 100 is initially driven using high-efficiency switching sequence 400 (shown in FIG. 4). The line-line capacitor voltages across input capacitors $C_i$ are monitored by controller 130 (shown in FIG. 1). To enable controller 130 to determine which switching sequence to apply, a predetermined voltage range 602 is defined in a memory of controller 130 using hysteresis. Controller 130 determines whether the measured input voltages fall within predetermined voltage range and selects which of the switching sequences to apply to switches 112 based on the outcome of the determination. Predetermined voltage range 602 ensures correct selection of a switching sequence irrespective of ripple on capacitor voltage and/or line voltage distortion. Additionally, controller 130 determines which sector of a plurality of predefined sectors (shown in FIG. 2) the measured input voltages fall within. The determined sector indicates which of switches 112 are commutated during switching sequences 300, 400.

When the voltages of the two active legs T6 and T2 approach an intersection point 604 (signaled by the line-line voltages approaching zero), controller 130 changes the switching sequence being applied from high-efficiency switching sequence 400 to an alternative high-quality switching sequence 606.

In the exemplary embodiment, alternative high-quality switching sequence 606 includes switching state signals 608, 610, 612 for each of switches 112 T1, T6, T2, respectively. Substantially, the pulse signals 610, 612 on active legs T6, T2 are not overlapping, in order to avoid the issues related to the voltage sliding intersection.

Switching ripple on the capacitor voltage or distortion on the line voltage causes multiple consecutive sub-phase-sector changes to occur in the SVM analysis. Alternative high-quality switching sequence 606 mitigates the losses present near intersection point 604 by applying the non-overlapping pulse signals 610, 612 while the sub-phase-sector is locked.

After crossing intersection point 604 and exceeding predetermined voltage range 602, controller 130 changes the applied switching sequence back to high-efficiency switching sequence 400.

In one embodiment, CSR 100 may be used as a front-end rectifier in double-conversion AC UPS applications. In another embodiment, CSR 100 may be used as a rectifying stage of DC UPS.

Additionally, alternative topologies performing as a current source at the input (e.g. matrix converters) may also benefit (to some extent) from the disclosed invention.

Exemplary embodiments of systems and methods for current source converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) increasing operating efficiency of CSRs and/or UPSs; (b) improving input power quality for CSRs; (c) reducing current distortion injected into CSRs near intersection points of the three-phases of input voltages; and (d) reducing component stress in CSRs such as switching overvoltage on power semiconductors.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A current source rectifier (CSR) system for a power source including three phase lines, said CSR system comprising:
    a rectifier operable to receive an alternating current (AC) input voltage and provide a direct current (DC) output voltage, the rectifier comprising:
        a first phase leg comprising first and second series-coupled switches coupled between a positive line and a negative line, wherein first and second diodes correspond with the first and second switches, and wherein a first node coupled to a first phase line of the three phase lines is directly connected between the first switch and a cathode end of the second diode;
        a second phase leg comprising third and fourth series-coupled switches coupled between the positive line and the negative line, wherein third and fourth diodes correspond and with the third and fourth switches, and wherein a second node coupled to a second phase line of the three phase lines is directly connected between the third switch and a cathode end of the fourth diode; and
        a third phase leg comprising fifth and sixth series-coupled switches coupled between the positive line and the negative line, wherein fifth and sixth diodes correspond with the fifth and sixth switches, and wherein a third node coupled to a third phase line of the three phase lines is directly connected between the fifth switch and a cathode end of the sixth diode; and
    a controller communicatively coupled to said rectifier and operable to:
        define a predetermined voltage range in a memory of the controller by hysteresis,
        control operation of said switches in accordance with a first switching sequence when measured input voltages on at least two phase lines of the three phase lines are outside of the predetermined voltage range, and
        control operation of said switches in accordance with a second switching sequence when the measured input voltages on the at least two phase lines are within the predetermined voltage range,
    wherein said controller is configured to:
        lock one switch from one of the first, second, and third phase legs in an ON position for the duration of the switching sequence used to control operation of the switches; and
        commutate one switch from each of the two remaining phase legs.

2. The CSR system in accordance with claim 1, wherein the first switching sequence is a switching sequence configured to improve efficiency of said CSR system when the measured input voltages are outside the predetermined voltage range, and the second switching sequence is a switching sequence configured to reduce current distortion caused when the measured input voltages are within the predetermined voltage range.

3. The CSR system in accordance with claim 1, wherein said controller is further configured to:
    receive the measured input voltages from at least one sensor coupled to the three phase lines;
    determine whether the measured input voltages fall within the predetermined voltage range; and
    select which of the first and second switching sequences to apply to said plurality of switches based on the determination.

4. The CSR system in accordance with claim 1, wherein the measured input voltages are associated with a sector of a plurality of predefined sectors in a space vector diagram, and wherein said controller is further configured to:
    determine which sector the measured input voltages fall within; and
    determine which of the switches to commutate based on the determined sector.

5. The CSR system in accordance with claim 1, wherein to control operation of said switches in accordance with the first and second switching sequences, said controller is further configured to generate and transmit control signals to selectively turn each respective switch ON and OFF.

6. The CSR system in accordance with claim 5, wherein to generate the control signals, said controller is configured to use space vector modulation (SVM).

7. The CSR system in accordance with claim 1, wherein to apply the first switching sequence, said controller is configured to:
    at least partially superimpose input voltages generated by the two commutated switches;
    determine which of the two commutated switches has a lower line-line voltage based on the measured input voltages; and perform all switching actions during the first switching sequence based on the determined lower line-line voltage to facilitate operating said CSR system at a higher efficiency.

8. The CSR system in accordance with claim 1, wherein to apply the second switching sequence, said controller is configured to:
generate symmetric switching pulses for the two commutated switches including a freewheeling state following each of the symmetric switching pulses; and
decouple the two commutated switches during the freewheeling state to improve a quality of the input power.

9. The CSR system in accordance with claim 8, wherein decoupling the two commutated switches during the freewheeling state reduces current distortion near intersections of two phases of the input voltage.

10. The CSR system in accordance with claim 1, wherein said controller is configured to:
control operation of said plurality of switches in accordance with the first switching sequence to improve efficiency of said CSR system by reducing switching losses; and
control operation of said plurality of switches in accordance with the second switching sequence as the measured input voltages converge towards an intersection point to reduce current distortion and improve quality of the power signals.

11. A method of controlling a current source rectifier (CSR) that includes a controller and a rectifier having a plurality of switches, each switch of the plurality of switches coupled to an associated phase line of three phase lines of a power source, said method comprising:
receiving, by the rectifier, three-phase alternating-current (AC) voltages from the power source;
controlling, by the controller, operation of the plurality of switches in accordance with a first switching sequence when measured input voltages on at least two phase lines of the three phase lines are outside of a predetermined voltage range; and
controlling, by the controller, operation of the plurality of switches in accordance with one of a plurality of second switching sequences configured to reduce current distortion when the measured input voltages on the at least two phase lines are within the predetermined voltage range
wherein controlling operation of the plurality of switches in accordance with at least one of the first switching sequence and the plurality of second switching sequences comprises:
locking one switch from one of first, second, and third phase legs of the CSR in an ON position; and
commutating one switch from each of the two remaining phase legs while the locked switch remains in the ON position for the duration of the switching sequence used to control operation of the plurality of switches, wherein the commutated switches are switched at different times.

12. The method in accordance with claim 11, wherein the first switching sequence is a switching sequence configured to improve efficiency of the CSR when the measured input voltages are outside the predetermined voltage range.

13. The method in accordance with claim 11, further comprising:
receiving the measured input voltages from at least one sensor coupled to the three phase lines;
determining whether the measured input voltages fall within the predetermined voltage range; and
selecting which of the first switching sequence and one of the plurality of second switching sequences to apply to the plurality of switches based on the determination.

14. The method in accordance with claim 11, wherein controlling operation of the plurality of switches in accordance with the first switching sequence or one of the plurality of second switching sequences comprises generating and transmitting space vector modulation (SVM) control signals to selectively turn each respective switch ON and OFF.

15. The method in accordance with claim 11, wherein to apply the first switching sequence, said method comprises:
at least partially superimposing input voltages generated by the two commutated switches;
determining which of the two commutated switches has a lower line-line voltage based on the measured input voltages; and
performing all switching actions during the first switching sequence based on the determined lower line-line voltage to facilitate operating said CSR system at a higher efficiency.

16. The method in accordance with claim 11, wherein to apply the one of the plurality of second switching sequences, said method comprises:
generating symmetric switching pulses for the two commutated switches including a freewheeling state following each of the symmetric switching pulses; and
decoupling the two commutated switches during the freewheeling state to improve a quality of the input power.

17. The method in accordance with claim 11, further comprising:
controlling operation of said plurality of switches in accordance with the first switching sequence to improve efficiency of said CSR system by reducing switching losses; and
controlling operation of said plurality of switches in accordance with the one of the plurality of second switching sequences as the measured input voltages converge towards an intersection point to reduce current distortion and improve quality of the power signals.

* * * * *